Patented June 27, 1939

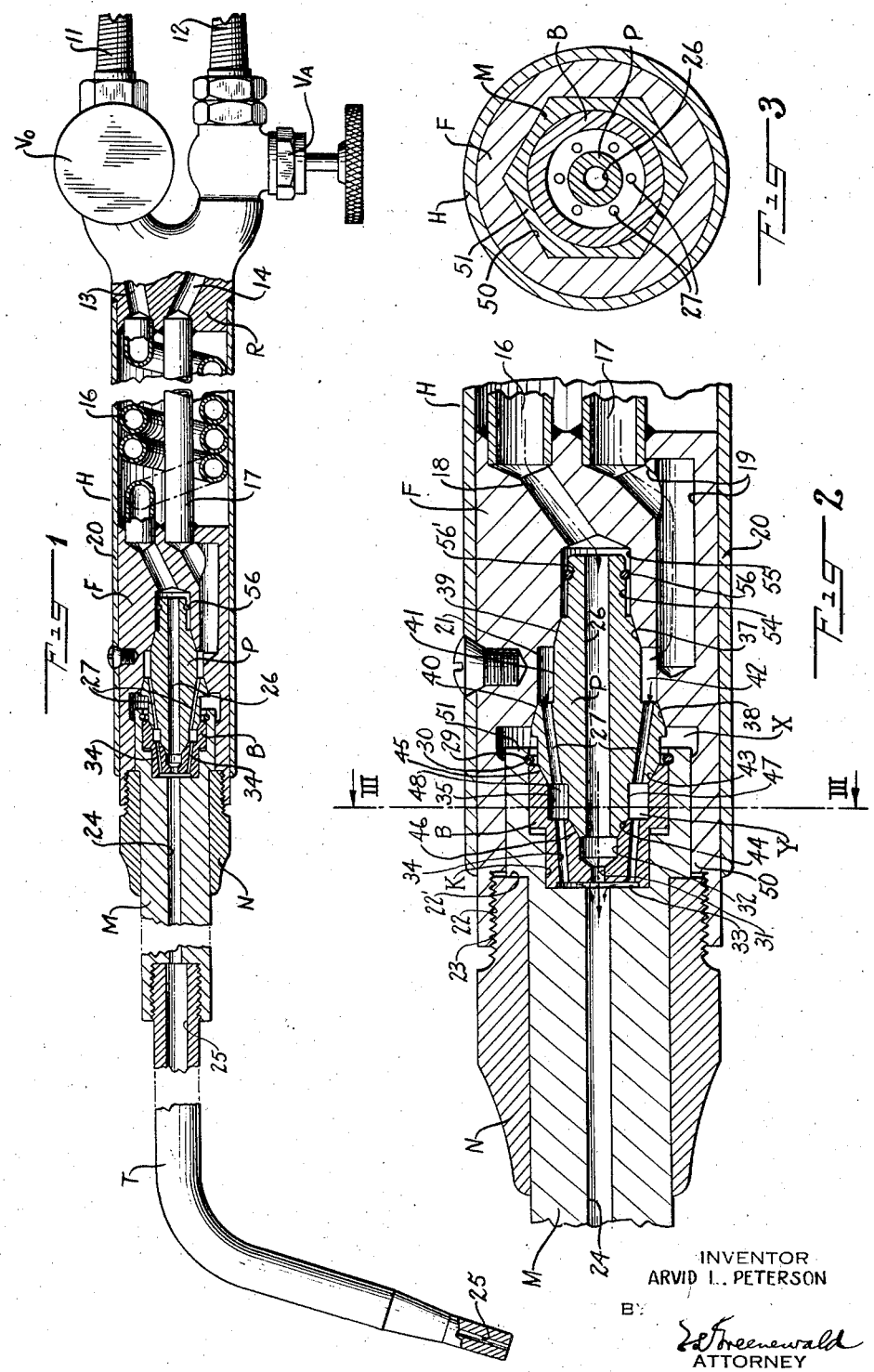

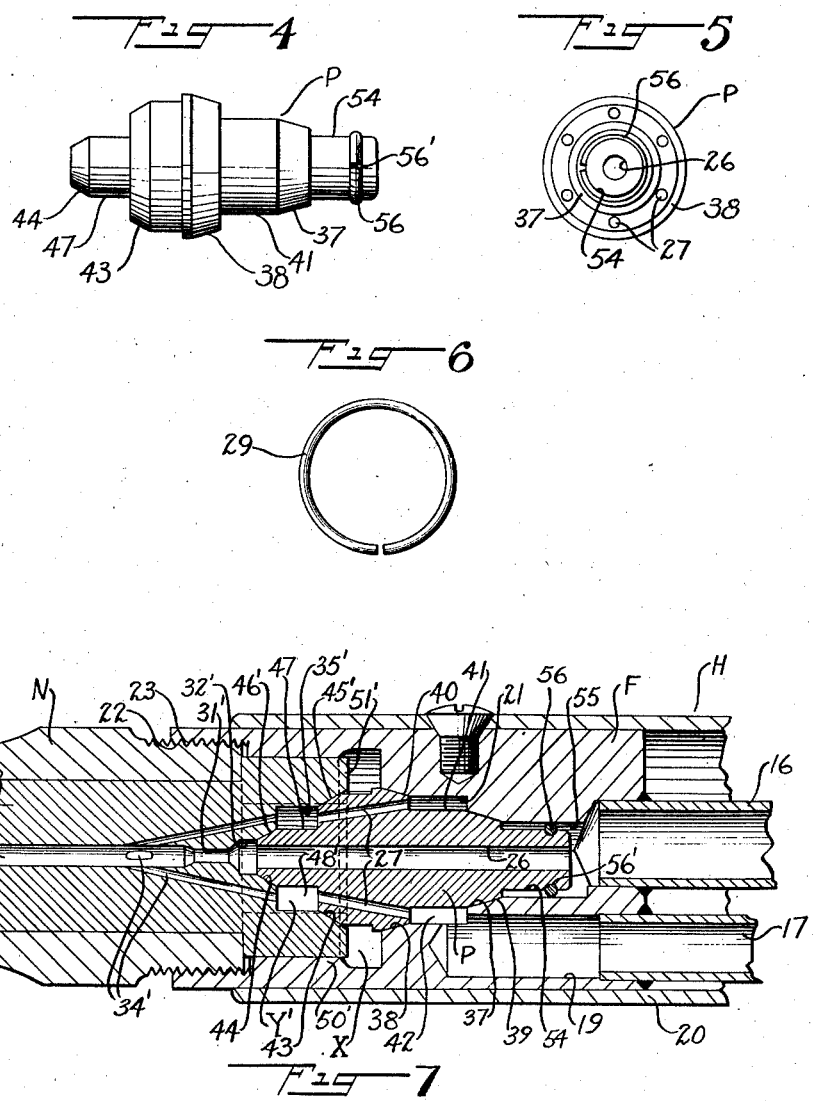

2,164,256

UNITED STATES PATENT OFFICE 2,164,256

BLOWPIPE

Arvid L. Peterson, Los Angeles, Calif., assignor, by mesne assignments, to Union Carbide and Carbon Corporation, a corporation of New York Application March 23, 1935, Serial No. 12,584

28 Claims. (Cl. 158—27.4)

This invention relates to blowpipes for mixing gases, such as acetylene and oxygen, and for discharging the combustible mixture to produce flames for use in heating, welding and cutting metals.

Parts of such blowpipes are detachably secured to one another to facilitate manufacture, repair and inspection. A set of interchangeable tips and mixers of different sizes usually is furnished with each blowpipe handle or body, so that the blowpipe may be readily provided with the proper size of tip and mixer to deliver the volume of mixture necessary to perform given kinds of work, e. g., for welding different thicknesses of metal. To prevent gas leakage, the various joints between the several gas-conducting parts must have accurate cooperating seating surfaces to fit together tightly, and these surfaces should be so constructed and arranged that they will be subject to a minimum of wear and damage, and so that any wear or damage which may occur may be easily detected and repaired.

The main objects of this invention are to provide a blowpipe in which the several parts, particularly the tip and mixer assembly, may be readily assembled and separated; in which the seating surfaces and joints will be maintained for a longer time in an accurate gas-tight condition; in which the tip and mixer assembly may be non-rotatably locked to the handle assembly in any one of a number of positions suiting the convenience of the user; and in which the gases are more effectively mixed and backfire resistance is increased.

These and other objects and novel features of this invention will become apparent from the following description and the accompanying drawings, in which:

Fig. 1 is a longitudinal sectional view of a blowpipe embodying this invention;

Fig. 2 is an enlarged longitudinal sectional view of the mid portion of Fig. 1, illustrating the principal novel features of the invention;

Fig. 3 is a cross-sectional view on the line III—III of Fig. 2;

Fig. 4 is a side view of the coupler assembly;

Fig. 5 is an end view of the coupler;

Fig. 6 is a plan view of a mixer plug retaining ring; and

Fig. 7 is an enlarged longitudinal sectional view of the mid portion of another blowpipe embodying novel features of this invention.

Referring to Fig. 1 of the drawings, the invention is shown as embodied in a welding blowpipe comprising a handle H to which is detachably connected a laterally and forwardly inclined tip T for delivering and applying the combustible mixture which produces the welding flame. The components of this mixture, such as oxygen and acetylene, are separately supplied to the blowpipe through hose couplings 11 and 12 and to passages 13 and 14, respectively, extending through a rear handle member or casting R which carries valves Vo and Va severally controlling the flow of the two gases. These gases may be conveyed from the forward ends of the passages 13 and 14 through a coiled pipe 16 and a straight pipe 17, respectively, to passages 18 and 19 in the inner end of a front handle member or gas inlet body member F. The front and rear members F and R may be rigidly secured together by a tube 20 which also encloses the gas pipes 16 and 17, and this assembly constitutes the body or handle H of the blowpipe.

The gas supply passages 18 and 19 respectively open into the bottom of and into a recess 21 in the side wall of the conical inner end of a socket X in the front member F. The front end of the socket X is open and is constructed and shaped to telescopically receive both the rear end of a tip-carrying tube or gas outlet head member M and an externally-threaded portion 22 of the securing nut N that engages the internal threads 23 adjacent the mouth of the socket X. The rear end of the tube M has a substantially conical socket Y and carries the mixer or means for properly delivering the two gases to the passage 24 which conveys the resulting mixture to the passage 25 extending through the tip T.

The sockets X and Y are opposed and axially alined to define a cavity of substantially double conical shape which contains a unitary substantially double-conical gas-conveying element, such as a plug or coupler P, having an axial bore providing a gas duct or passage 26 and a circular row of longitudinal drillings providing gas ducts or passages 27 for conveying the two gases from the passages 18 and 19 to the mixer and the passage 24 in the tip-carrying tube M. When the parts have been assembled and the nut N has been tightened, as shown in Figs. 1 and 2, the coupler P is completely enclosed in the cavity between the members F and M, and makes appropriate gas-tight joints with the walls thereof, as will be explained.

The initial mixing of the two gases occurs within the inner or rear end of the tip-carrying member M. Referring to Fig. 2, the socket Y may be formed in a mixer block B which fits snugly within a cavity K in the rear end of member M and is removably secured in place by resilient key means, such as a split resilient metal snap ring 29 which seats in an internal groove 30 adjacent the lip of the cavity K and overhangs and bears against the outer edge of the block B. This block has a central restricted oxygen passage 31 therethrough which is axially alined with the mixture passage 24 in member M and is enlarged or counterbored, as at 32. The bottom of the block B is slightly countersunk within its margin to provide a thin annular or disk-like chamber 33 between the bottom of the cavity K and the bottom of the mixer block, surrounded by an annular flange seated on the bottom of said cavity and constituting an annular wall. A circular series of acetylene passages 34 of smaller diameter than the oxygen passage 31 extend from an annular recess 35 in the wall of the conical socket Y into the thin chamber 33, from which the acetylene may be drawn into the passage 24 by the oxygen stream discharging into the latter from the passage 31.

To keep the gases separate from one another until they reach the mixer and to prevent gas leakage from the blowpipe, each conical section of the coupler P has a pair of frusto-conical male seating surfaces adapted to engage correspondingly shaped annular female seating surfaces in the sockets X and Y; and between each pair of seating surfaces on the coupler there is an annular recess which is adapted to register with a substantially similar recess in the wall of each socket, to form annular gas-distributing chambers which are connected by the passages 27 in the coupler. The coupler seating surfaces 37, 38 respectively, engage the seats 39, 40 in the socket X in conical surface-to-surface contact; and an annular recess 41 between the surfaces 37, 38 registers with the socket recess 21 to provide an annular chamber 42 to which fuel gas or acetylene is supplied from the passage 19 to be distributed to the passages 27. Similarly, the coupler seating surfaces 43, 44 respectively engage the seats 45, 46 in the socket Y; and an annular recess 47 between the surfaces 43, 44 registers with the socket recess 35 to provide an annular chamber 48 which receives acetylene from the passages 27 and distributes this gas to the passages 34 in the mixer block. The several pairs of gas-tight joints thus provided effectively prevent gas leakage from the blowpipe, and separate the acetylene and oxygen until they are intended to be mixed. The groups of drillings and the chambers through which the acetylene flows also aid in improving the flashback resistance of the blowpipe.

To weld work in various positions, blowpipe users often find it desirable to change the direction of the tip relatively to the hand holding the blowpipe, keeping the valves Vo and Va in a fixed position and easily accessible to the other hand. Heretofore, the user has generally done this adjusting by turning the tip-carrying assembly about its main longitudinal axis, using the inclined tip as a crank and often neglecting to loosen the securing nut N. This practice is decidedly objectionable because it rapidly wears and often scores the seating surfaces between the several parts, and soon results in leaking joints, unsatisfactory performance and possible danger to the user. To overcome this objection in prior blowpipes, in the present construction the tip-carrying member or assembly is positively locked against rotation relatively to the body or handle member to which it is connected; and, in addition, the tip may readily be set and locked in any one of a number of positions relatively to the handle, by a simple manipulation of the parts which will not wear or damage the seating surfaces.

As best shown in Figs. 2 and 3, a section of the socket X back of the threaded portion 23 is made non-circular in cross-section, as at 50; and the outside of the head or inner end of the tip-carrying member M is similarly shaped in cross-section, as at 51, but just sufficiently smaller in size so that the head 51 will readily slide axially into the socket section 50 without looseness or rotary play when the parts are secured together. As shown, the cooperating parts 50, 51 preferably are polygonal in section—hexagonal in the present instance—so that the tip T may be set and locked in any one of six (more or less) positions relatively to the handle by unscrewing the nut N, axially separating the members F and M, turning the tip T to the desired position, and then reassembling the parts and securing them together by screwing the nut N into the socket X until the inner end of the threaded part 22 bears tightly against the shoulder 22' near the rear end of the member M.

The members F, M and B are desirably made of brass or similar metal for manufacturing economy, and the seats in the sockets X and Y of these members are quite well protected from damage of ordinary use. However, the annular seating surfaces on the coupler P are exposed and more subject to damage; and these seating surfaces are therefore preferably formed of harder metal than the metal forming the seats in the sockets X and Y. For this purpose, the entire coupler is desirably made of hard metal such as Monel metal, for example. For convenience and to further protect the seating surfaces of the coupler P, as from damage by accidentally dropping the same on concrete or metal during assembling or disassembling, suitable means may be provided to releasably retain the coupler in connected relation to one of the sockets, e. g., the socket X. As shown, one end of the coupler may have an extension 54 of a uniform diameter slightly less than the uniform bore 55 at the bottom of the socket X, and a resilient device, such as a split ring 56 of resilient metal, seated in but projecting from a circumferential groove 56' in the extension 54 frictionally engages the wall of the bore 55. This frictional engagement is sufficient to hold the coupler in place when the other members are removed from the socket X and during careless handling; nevertheless the coupler may be readily pulled out of the socket when desired, and it may also be as quickly inserted and accurately reseated without wearing or damaging the socket seats.

The blowpipe construction shown in Fig. 7 is practically identical with the preferred embodiment of the invention just described, and shown in Figs. 1-6, inclusive, except that instead of providing a separate mixer block B, the socket, seats, passages, etc., at the rear end of the tip-carrying member are formed directly in and unitary with the latter. Here, the conical socket Y' has a pair of annular seats 45', 46' and an annular recess 35' between such seats. A plurality of passages 34' are drilled diagonally from spaced points in the recess 35' and open into the mixture passage 24' at a short distance in front of the constricted throat 31' and counterbore 32' which latter are in line with the oxygen passage 26 in the coupler P, as well as in axial alinement with the gas mixture passage 24'. The seating surfaces 43, 44 of the coupler make gas-tight joints with the seating surfaces 45', 46' and the coupler recess 47 registers with the recess 35' to provide an annular chamber 48' that receives acetylene from the coupler passages 27 and distributes this gas to the passages 34'. The head 51' of the member M' and the section 50' in the socket X of the member F are non-circular or polygonal in cross section, and these parts telescopically interfit and interlock in the same manner as the corresponding parts in Figs. 1, 2 and 3, to positively prevent relative rotation of the assembled parts and mutilation of the seats but to permit adjustment of the tip T into different radial positions, when desired, as already described.

While the invention has been disclosed as embodied in two species of welding blowpipe, it will be understood that the same may be embodied in other forms of welding blowpipes and generally in heating, cutting and other types of blowpipes; also, certain of the novel features may be employed without others and various changes may be made in the details of construction and arrangement shown without departing from the invention or sacrificing its advantages.

I claim:

1. A blowpipe comprising, in combination, a member having a socket and gas supply passages opening into said socket; a tip-carrying member having a socket and a gas mixture passage leading from its socket; the socket portion of one of said members fitting into the socket of the other member; a coupler having its opposite ends severally and separably seated in said sockets in conical surface-to-surface gas-tight contact and having gas ducts therethrough communicating with the passages in said members; and means securing said members and said coupler together.

2. A blowpipe comprising, in combination, a member having a socket and a gas supply passage opening into said socket; a tip-carrying member having a socket and a gas mixture passage leading from its socket; a coupler having its opposite ends severally and separably seated in said sockets in conical surface-to-surface gas-tight contact and having a gas duct extending axially therethrough adapted to receive gas from said gas supply passage and discharge the same into said gas mixture passage; and means securing said members and said coupler together.

3. A blowpipe comprising, in combination, a metal member having a socket and gas supply passages opening into said socket; a tip-carrying metal member having a socket at one end, a tip at the other end, and a gas passage therebetween; a metal coupler having its opposite ends severally and separably seated in said sockets, said coupler having gas passages therethrough communicating with the passages in said members and being of harder metal than the parts against which it seats; and means securing said members and coupler together.

4. A blowpipe comprising, in combination, a metal member having a socket and gas supply passages opening into said socket; a tip-carrying metal member having a tip at one end, a socket at its other end, and a gas mixture passage therebetween; the socket portion of one of said members extending into the socket of the other member; a metal coupler having its opposite ends severally and separably seated in said sockets, said coupler consisting of harder metal than the parts of said sockets against which it seats and having gas passages therethrough communicating with the passages in said members; and means securing said members and coupler together.

5. A blowpipe comprising, in combination, a member having gas passages adapted to be connected to gas supply means; a tip-carrying member having a gas mixture passage; gas-conveying means between said members comprising an element having gas ducts; and a resilient device bearing against said element and against one of said members to normally secure them together but providing for their quick separation when manually pulled apart.

6. A blowpipe according to claim 5, in which one of said members has a socket, said gas-conveying element extends into said socket, and said resilient device is disposed in said socket.

7. A blowpipe comprising, in combination, a member having gas passages adapted to be connected to gas supply means; a tip; a member having a gas mixture passage connected to said tip; gas-conveying means having gas ducts adapted to convey gases from said gas passages to said mixture passage; and removable means between said gas-conveying means and one of said members to frictionally secure said gas-conveying means to the last-mentioned member, said removable means positively engaging gas-conveying means and frictionally engaging said last-named member.

8. A blowpipe comprising, in combination, a member having a socket and gas supply passages opening into said socket; a tip; a member having a socket and a gas mixture passage leading from its socket and connected to said tip; a coupler having its opposite ends severally seated in said sockets and having gas ducts therethrough connecting the passages in said members; means retaining said coupler in one of said sockets, said means positively engaging said coupler and frictionally engaging the wall of said socket; and means securing said members and said coupler together.

9. A blowpipe according to claim 8, in which such retaining means comprises a resilient member engaging both said coupler and the wall of said socket.

10. A blowpipe comprising, in combination, a member having a socket and gas supply passages opening into said socket; a tip; a member having a socket and a gas mixture passage leading from its socket and connected to said tip; a coupler having its opposite ends severally seated in said sockets and having gas ducts therethrough connecting the passages in said members; means frictionally retaining said coupler in one of said sockets; and means securing said members and said coupler together; in which such retaining means comprises an expansible spring ring carried by said coupler and engaging opposed portions of said coupler and the wall of said socket.

11. A blowpipe comprising, in combination, a member having a socket and gas passages adapted to be connected to gas supply means; a tip-carrying member having a socket and gas passage means; and means for operatively coupling said members together to establish communication between said gas passages and said gas passage means, one of said members having a socket portion and the other member having a portion fitted into said socket portion, such interfitting portions being axially separable and so shaped that they are strictly non-rotatably movable relatively to one another when they are in interfitted relation; said coupling means comprising a coupler having its opposite ends severally and separably seated in said sockets in conical surface-to-surface contact and having gas ducts therethrough communicating with said gas passages and gas passage means.

12. A blowpipe according to claim 11, in which said socket portion is polygonal in cross section and the portion of said other member fitting therein has a similar polygonal periphery.

13. A blowpipe comprising, in combination, a member having gas passages adapted to be connected to gas supply means; a tip-carrying member having a gas mixture passage; gas conveying means having gas ducts communicating with both said gas passages and said mixture passage; and means for securing said members together with said gas conveying means interposed between said members, one of said members having a socket portion and the other of said members having an end portion longitudinally slip fitted into said socket portion, such interfitting portions being so shaped that said members are positively held against any rotational movement relatively to one another.

14. A blowpipe comprising, in combination, a handle member having a socket and gas passages adapted to be connected to gas supply means; a tip-carrying member having a socket and a gas mixture passage therethrough and comprising a stem and a tip disposed at an angle to the axis of said stem; a coupler having its opposite ends severally and separably seated in said sockets; said gas passages communicating with said mixture passage through said coupler; and means for securing said tip-carrying member to said handle member, including polygonally shaped interfitting ends on said tip-carrying member and said handle member for interlocking said members against any rotational movement relatively to one another about the axis of said stem.

15. A blowpipe comprising, in combination, a handle member having a socket and gas passages adapted to be connected to gas supply means; a tip-carrying member having a socket and a gas mixture passage therethrough and comprising a stem and a tip disposed at an angle to the axis of said stem; means establishing communication between said gas passages and said mixture passage and comprising a coupler having its opposite ends severally and separably seated in said sockets; and means for rigidly securing said tip-carrying member to said handle member, such securing means including a coupling nut and means for interlocking said members in any one of a number of predetermined positions to set said tip in any one of a number of fixed angular positions relatively to the common axis of said assembled members.

16. A blowpipe comprising, in combination, a handle member having a pair of axially spaced concentric annular seats and gas passages terminating adjacent said seats, one of said gas passages being coaxial with said annular seats; a tip or burner nozzle; a tip-carrying member having a pair of axially spaced concentric annular seats and gas passages terminating adjacent said seats, the last-named passages communicating with said tip or burner nozzle, and one of said last-named passages being coaxial with said last-named annular seats; and a coupler having pairs of annular concentric seating surfaces severally engaging the pairs of seats of said members, said coupler having gas ducts communicating with the gas passages in said members, and one of said gas ducts being coaxial with said annular seating surfaces.

17. A blowpipe as claimed in claim 16, in which said members have sockets disposed in opposed relation, the pairs of seats of said members are in said sockets, and the portions of said coupler having said seating surfaces extend into said sockets.

18. A blowpipe comprising, in combination, a member having a cavity and a gas mixture passage leading from said cavity; a mixer block in said cavity having passages adapted to deliver combustible gas and combustion-supporting gas to said mixture passage; and resilient key means retaining said block in said cavity.

19. A blowpipe as claimed in claim 18, in which said resilient key means comprises a split ring that engages one end of said block, and said cavity has a groove constituting a seat for said ring.

20. A blowpipe comprising, in combination, a member having a cavity and a gas mixture passage leading from the bottom of said cavity; a mixer block in said cavity; and means providing a disk-like chamber between the bottom of said cavity and the inner end of said block, said chamber communicating with said mixture passage; means providing a snug gas-tight fit between the inner end of said block and the bottom of said cavity around said chamber; said mixer block having a central gas passage in line with said mixture passage and also having passage means leading into said chamber.

21. A blowpipe as claimed in claim 20, in which said block has a shallow recess in its bottom face opposed to the bottom of said cavity to provide said chamber surrounded by an annular flange seated on the bottom of said cavity, and said block has an annular series of drillings extending therethrough from its top face into said recess to provide said passage means.

22. A blowpipe comprising, in combination, a member having a cavity and a gas mixture passage leading centrally from the bottom of said cavity; and a mixer block extending into said cavity and having a socket in its outer end provided with a pair of annular seats and an annular recess between said seats; said block having a passage extending therethrough from the bottom of said socket in line with said mixture passage and also having spaced passages extending therethrough from said recess into the bottom face of the block; the bottom faces of said cavity and said block being conformed to provide a disk-like chamber therebetween surrounded by an annular wall snugly fitting the bottom of said cavity, said spaced passages opening into said chamber and the inner side of said chamber opening into said mixture passage.

23. A blowpipe comprising, in combination, a member having a socket provided with a pair of annular seats, a gas mixture passage, a constricted throat connecting the bottom of said socket to said gas mixture passage, said gas mixture passage and said constricted throat being in axial alinement, and gas passage means extending from said socket in the region between said seats to said mixture passage; and means for separately supplying gases to said throat and to said gas passage means.

24. A blowpipe as claimed in claim 23, in which said gas passage means comprises a plurality of passages terminating in said mixture passage and in said socket.

25. A blowpipe comprising a handle member having a socket and gas supply passages opening into said socket; a tip-carrying member having a cavity and a gas mixture passage leading from said cavity; a mixer block within said cavity and having a socket communicating with said gas mixture passage; a thin annular chamber between the bottom of said cavity and the inner end of said block communicating with said gas mixture passage; a coupler having its opposite ends severally seated in said sockets and having gas ducts therethrough connecting the passages in said members; means frictionally retaining said coupler in one of said sockets; and means for securing said tip-carrying member to said handle member, including means for interlocking said members against rotation relatively to one another.

26. A blowpipe comprising, in combination, a gas inlet body member having a socket portion provided with frusto-conical female seating means; a gas outlet head member having a socket portion provided with frusto-conical female seating means; the socket portions of said members being telescoped; an internal coupling member having opposed frusto-conical male seating means coupled with the corresponding female seating means of said body and head members, and having gas passage means therein; and means securing said members in longitudinal compression whereby said coupling member is caused to assume a postion such that an effective leak-proof but longitudinally separable surface-to-surface gas-tight contact is established respectively between both of said frusto-conical male and female seating means.

27. A blowpipe comprising, in combination, a member having gas passages adapted to be connected to gas supply means; a tip-carrying member having a gas mixture passage; gas conveying means between said members comprising an element having gas ducts; and a resilient device bearing against said element and against one of said members to secure them together; in which combination one of said members has a cylindrical bore, said gas-conveying element extends into said bore, said resilient device is disposed in said bore and is substantially a ring, and a groove is provided in one of these parts to serve as a seat for said ring.

28. A blowpipe comprising a first member having a socket and gas supply passages opening into said socket; a second member having a cavity and a gas mixture passage leading from said cavity; a mixer block within said cavity and having a socket communicating with said gas mixture passage; a thin annular chamber between the bottom of said cavity and the inner end of said block communicating with said gas mixture passage; a coupler having its opposite ends severally steated in said sockets and having gas ducts therethrough connecting the passages in said members; means frictionally retaining said coupler in one of said sockets; and means for securing said second member to said first member, including means for interlocking said members against rotation relatively to one another.

ARVID L. PETERSON.